United States Patent
Miki et al.

(10) Patent No.: US 9,077,532 B2
(45) Date of Patent: Jul. 7, 2015

(54) USER TERMINAL AND BASE STATION APPARATUS

(75) Inventors: Nobuhiko Miki, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 141 days.

(21) Appl. No.: 13/640,064

(22) PCT Filed: Apr. 5, 2011

(86) PCT No.: PCT/JP2011/058574
§ 371 (c)(1),
(2), (4) Date: Nov. 8, 2012

(87) PCT Pub. No.: WO2011/125997
PCT Pub. Date: Oct. 13, 2010

(65) Prior Publication Data
US 2013/0051344 A1    Feb. 28, 2013

(30) Foreign Application Priority Data
Apr. 9, 2010  (JP) .................. 2010-090707

(51) Int. Cl.
*H04W 4/00*    (2009.01)
*H04L 1/18*    (2006.01)
*H04W 72/04*    (2009.01)

(52) U.S. Cl.
CPC ......... *H04L 1/1861* (2013.01); *H04W 72/0453* (2013.01)

(58) Field of Classification Search
CPC .................................................. H04L 1/1861
See application file for complete search history.

(56) References Cited

U.S. PATENT DOCUMENTS

2011/0261679 A1* 10/2011 Li et al. .......................... 370/216
2012/0314675 A1* 12/2012 Vujcic ............................ 370/329

OTHER PUBLICATIONS

International Search Report w/translation issued in PCT/JP2011/058574 mailed Jun. 28, 2011 (4 pages).
Panasonic; "Further discussion on PDCCH with cross carrier operation"; 3GPP TSG-RAN WG1 Meeting #59bis, R1-100361; Valencia, Spain; Jan. 18-22, 2010 (6 pages).
Ericsson; "Synchronized RRC re-configuration"; TSG-RAN WG2 #61, R2-080762; Sorrento, Italy; Feb. 11-15, 2008 (5 pages).

* cited by examiner

*Primary Examiner* — Huy D Vu
*Assistant Examiner* — Kevin Cunningham
(74) *Attorney, Agent, or Firm* — Osha Liang LLP

(57) ABSTRACT

To maintain communications of uplink ACK/NACK signals even for a transition period during which the number of aggregated component carriers is added/removed by higher layer signaling, it is a feature providing a reception section that receives the PDSCH for each of CCs that constitute the system band, a demodulation section (406) that demodulates the received PDSCH of each of CCs, an ACK/NACK signal generating section (418) that generates an uplink ACK/NACK signal in response to a demodulation result of the PDSCH in the demodulation section (406), and a mapping section (415) that allocates radio resources to an uplink ACK/NACK signal of the anchor block using LTE, while allocating user-specific radio resources to uplink ACK/NACK signals of the other CCs.

7 Claims, 11 Drawing Sheets

USER TERMINAL AND BASE STATION APPARATUS

TECHNICAL FIELD

The present invention relates to a radio communication system for transmitting signals using a single or a plurality of component carriers selected on a base frequency block (hereafter, referred to as a "component carrier") basis from an available band (maximum band), and more particularly, to a user terminal for generating uplink acknowledgment (ACK) or negative acknowledgement (NACK) (hereinafter, referred to as an "ACK/NACK signal") and a base station apparatus for receiving the uplink ACK/NACK signal from the user terminal.

BACKGROUND ART

The 3GPP that is a standardization organization of W-CDMA (Wideband Code Division Multiple Access) has defied a communication system that is a successor to W-CDMA and HSDPA (High Speed Downlink Packet Access) i.e. Long Term Evolution (LTE), and has adopted OFDMA (Orthogonal Frequency Division Multiple Access) in downlink, and SC-FDMA (Single-Carrier Frequency Division Multiple Access) in uplink. Currently, the 3GPP has studied a system successor to LTE (LTE-Advanced or Release 10).

The LTE system is a system in which a plurality of mobile stations UEs shares one, or two physical channels or more in both uplink and downlink to perform communications. The channels shared by a plurality of mobile stations UEs are generally called the shared channels, and in LTE, are the PDSCH (Physical Downlink Shared Channel) in downlink and the PUSCH (Physical Uplink Shared Channel) in uplink.

In the LTE system, a base station eNB transmits a downlink control channel (PDCCH: Physical Downlink Control Channel) and PDSCH to a mobile station UE on a subframe-by-subframe basis. The mobile station UE demodulates the PDCCH to acquire a control signal for PDSCH demodulation, and based on the acquired control signal, demodulates the PDSCH. Then, the mobile station UE transmits an ACK/NACK signal indicative of the presence or absence of a packet error in decoding the PDSCH to the base station eNB on an uplink control channel (PUCCH: Physical Uplink Control CHannel).

PRIOR ART DOCUMENT

Non-Patent Document

[Non-patent Document 1] 3GPP, R-1100361, Panasonic, "Further discussion on PDCCH with cross carrier operation"
[Non-patent Document 2] 3GPP, R2-080762, Ericsson, "Synchronized RRC re-configuration"

SUMMARY OF INVENTION

Technical Problem

In addition, in LTE-A of which studies have currently proceeded in the 3GPP, an agreement is made on aggregation of a plurality of component carriers to broaden the band. Such a communication environment may occur that a part of component carriers receive strong interference from another cell, and that an effect of the interference is a little on another component carrier. Therefore, studied is a scheme for transmitting downlink control information (DCI), which is to demodulate a shared data channel (PDSCH/PUSCH) transmitted in a component carrier of low communication quality, on the PDCCH of another component carrier with a little effect of interference.

However, uncertain is a scheme for transmitting an uplink ACK/NACK signal in response to a PDSCH received in each of a plurality of downlink component carriers to the base station eNB.

The present invention was made in view of the respect, and it is an object of the invention to provide a user terminal and base station apparatus for achieving resource control suitable for transmission of uplink ACK/NACK signals in response to PDSCHs of a plurality of component carriers to the base station.

Solution to Problem

One aspect of the invention is a user terminal that connects to a communication system in which a system band is added or removed on a base frequency block basis to communicate, and is characterized by having a reception section configured to receive a data channel for user data transmission for each of base frequency blocks that constitute the system band, a demodulation section configured to demodulate the data channel of each of the base frequency blocks received in the reception section, an ACK/NACK signal generating section configured to generate an uplink ACK/NACK signal for each of the base frequency blocks in response to a demodulation result of the data channel in the demodulation section, and a mapping section configure to define one of the base frequency blocks that constitute the system band as an anchor block, and allocate a radio resource to an uplink ACK/NACK signal generated in response to a data channel demodulation result of the anchor block, using a resource allocation scheme for one base frequency block, while allocating a radio resource to an uplink ACK/NACK signal generated in response to a data channel demodulation result of another base frequency block, using a resource allocation scheme for a plurality of base frequency blocks.

Technical Advantages Of Invention

According to the invention, it is possible to maintain transmission of an uplink ACK/NACK signal in response to the PDSCH even for a transition period during which the number of aggregated component carriers is increased/reduced by higher layer signaling.

DESCRIPTION OF EMBODIMENTS

Described are radio resources of an uplink ACK/NACK signal defied in LTE. In LTE, radio resources of an uplink ACK/NACK signal are associated with radio resources of a downlink control signal (DCI).

Figure 1:
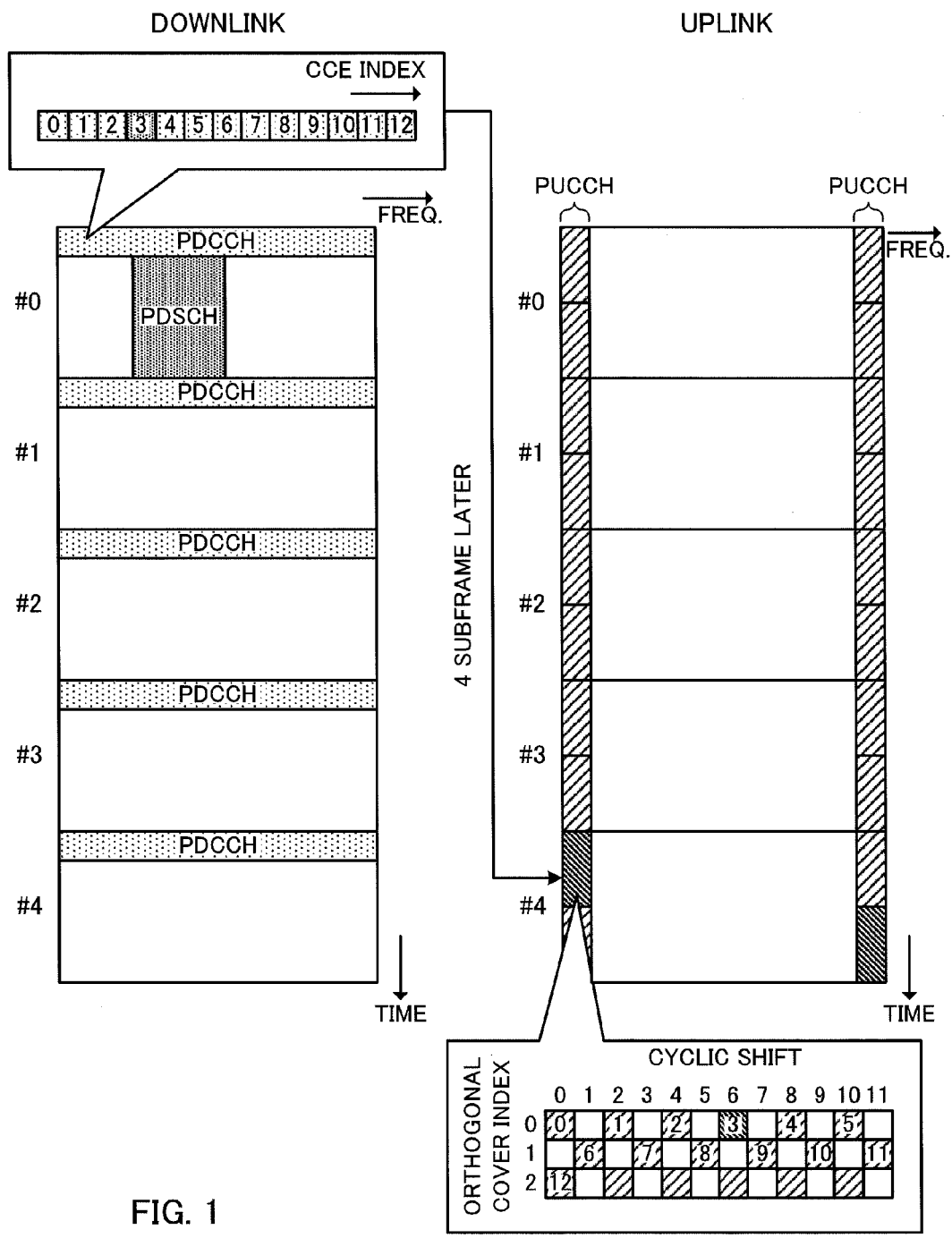
FIG. 1 is a diagram to explain association between radio resources of an uplink ACK/NACK signal and downlink radio resources.

Referring to FIG. 1, described is association between radio resources of an uplink ACK/NACK signal and downlink radio resources. FIG. 1 shows five subframes in each of downlink and uplink.

As shown in FIG. 1, for physical downlink channels, PDCCHs are assigned to a region of some beginning OFDM symbols (one, two or three OFDM symbols) in each of subframes (#0 to #4), and PDSCHs are assigned to the remaining predetermined region of each of subframes (#0 to #4). The PDCCH is assigned radio resources on a basis of a CCE (Control Channel Element) that is a signal transmission block. One CCE is comprised of nine REGs (Resource Element Groups), and one REG is comprised of four subcarriers. Each CCE is capable of being represented by an index (CCE index). CCEs are allocated so that the same CCE index does not overlap for a plurality of users multiplexed in the same subframe. The downlink control information (DCI) transmitted on the PDCCH includes a control signal (for example, resource allocation information) for PDSCH demodulation. A user terminal transmits an uplink ACK/NACK signal using a subframe (#4) which is 4 subframes later after a subframe (#0) in which the PDSCH is received.

As shown in FIG. 1, for physical uplink channels, radio resources at both ends in the system band in each of subframes (#0 to #4) are allocated to PUCCHs. To obtain frequency diversity gain, intra-subframe frequency hopping is applied to each PUCCH. The PUCCH conveys the uplink ACK/NACK signal in response to the PDSCH and the like.

It is possible to represent a resource unit allocated to the PUCCH by the CCE index. For the uplink ACK/NACK signal, the lowest CCE index of radio resources (CCE indexes) allocated to the PDCCH is used as an ACK index. As shown in FIG. 1, in association with CCE index #3 that is the lowest number among CCEs allocated to the PDCCH, radio resources assigned to ACK index #3 that is the same index number are allocated to an uplink ACK/NACK signal. The user terminal knows the lowest CCE index of radio resources (CCE indexes) allocated to the PDCCH in performing blind decoding on a search space of the PDCCH. Thus, radio resources (ACK index) of the uplink ACK/NACK signal are associated with downlink radio resources (CCE index).

Meanwhile, in LTE-A (Rel. 10), carrier aggregation is applied in which a plurality of component carriers (each up to maximum 20 MHz) is aggregated to achieve broadening of the system band. Further, for the uplink control channel, it is agreed transmitting from only one component carrier.

Figure 2:
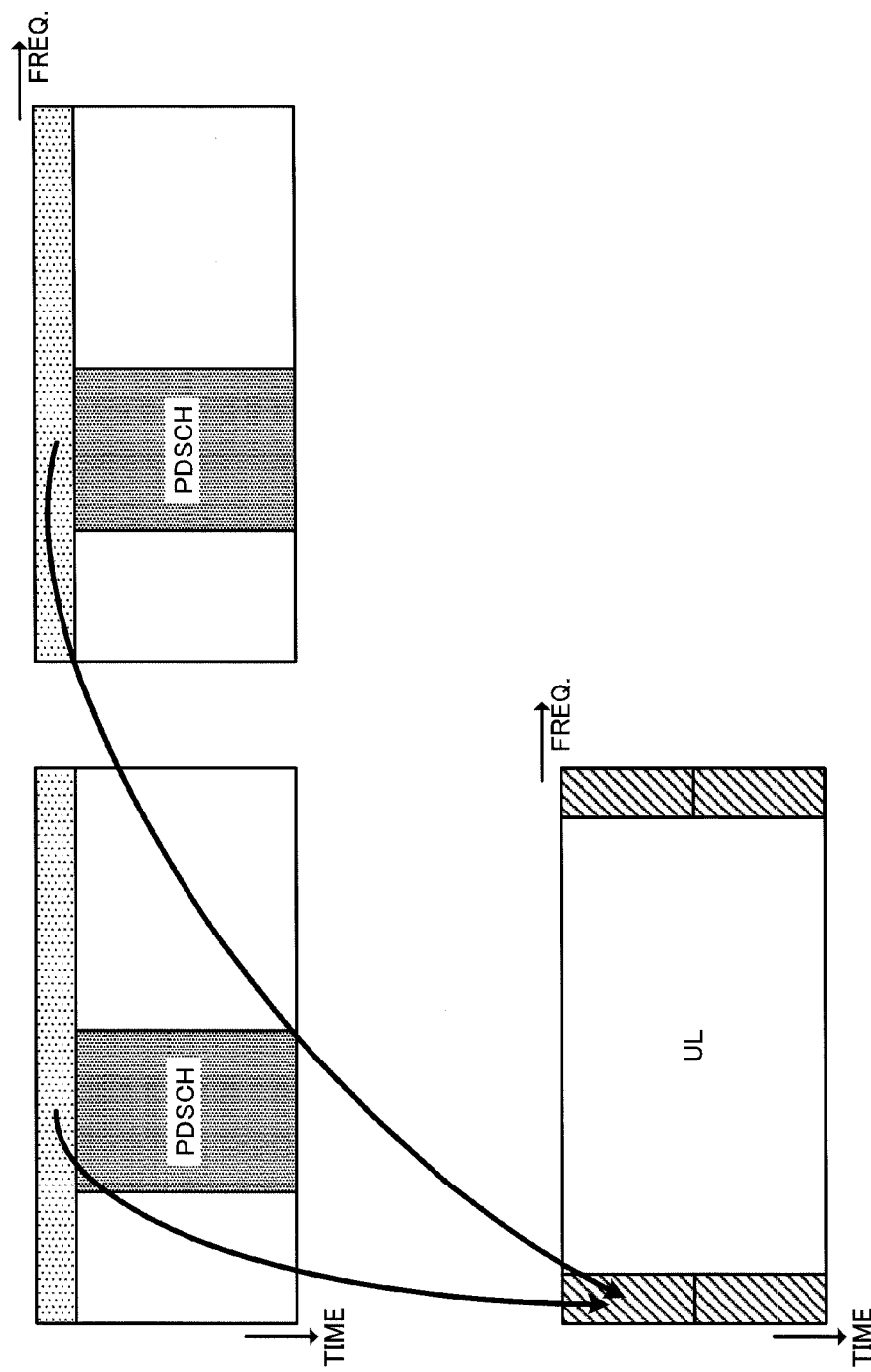
FIG. 2 is a diagram to explain mapping from a plurality of component carriers to one component carrier.

As shown in FIG. 2, an uplink ACK/NACK signal in the case of performing carrier aggregation on downlink component carriers requires mapping from a plurality of component carriers to one component carrier. This means that the number of radio resources allocated to an uplink ACK/NACK signal changes when a component carrier is added or removed and the carrier aggregation number changes.

The inventor of the invention noted that the number of radio resources allocated to an uplink ACK/NACK signal changes in response to a change in the carrier aggregation number, studied the uplink radio resource allocation method for enabling transmission of an uplink ACK/NACK signal to be maintained even for a transition period to change the carrier aggregation number, and arrived at the invention.

In one aspect of the invention, in a radio communication system in which a first communication system and a second communication system are provided while overlapping where the first communication system is to add or remove, on a component carrier basis, a frequency band assigned to communications between a base station apparatus and a user terminal, and the second system is to communicate via one fixed component carrier between a base station apparatus and a user terminal, one of component carriers assigned to the user terminal by the first communication system is defined as an anchor carrier, and in the anchor carrier, the same resource allocation of an uplink ACK/NACK signal as in the second communication system is compensated.

According to the invention, it is possible to maintain transmission of an uplink ACK/NACK signal of the anchor carrier even for a transition period during which the number of aggregated component carriers is increased/reduced by higher layer signaling.

Figure 3:
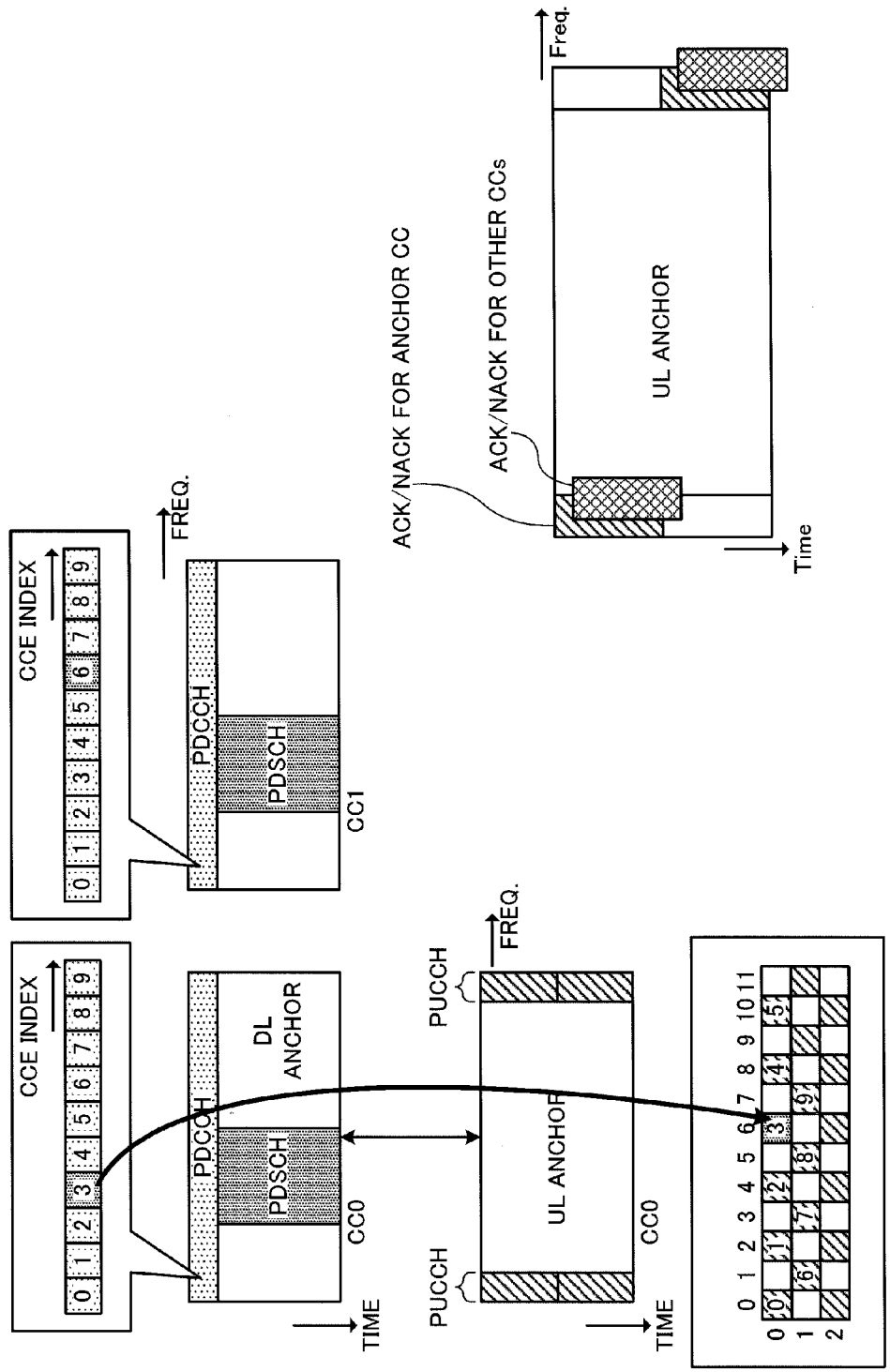
FIG. 3 is a diagram to explain resource allocation of an uplink ACK/NACK signal in an anchor carrier.

Referring to FIG. 3, resource allocation of an uplink ACK/NACK signal in the anchor carrier will be specifically described. FIG. 3A shows a state in which a system band is configured by aggregation of two component carriers of component carrier CC0 and component carrier CC1.

In the downlink component carrier CC0, radio resources that the index of 3 (index=3) is the lowest CCE index are allocated to downlink control information (DCI) to a mobile terminal apparatus. In the other component carrier CC1, radio resources that the index of 6 (index=6) is the lowest CCE index are allocated to downlink control information (DCI) to a mobile terminal apparatus.

In FIG. 3, one component carrier, CC0, is selected as an anchor carrier. The anchor carrier is a carrier in which the same operation as in LTE is compensated at least on resource allocation of an uplink ACK/NACK signal even for a transition period during which the number of aggregated component carriers is increased/reduced. Alternatively, the anchor carrier is expressed as a carrier in which resource allocation of an uplink ACK/NACK signal that the same operation as in LTE is compensated exists even in the case where the number of resource allocations of an uplink ACK/NACK signal changes.

As shown in FIG. 3A, in the case of receiving the PDCCH and PDSCH in the downlink anchor carrier (CC0), radio resources with the ACK index of 3 (ACK index=3) that is the same index as downlink radio resources (CCE index=3) are allocated to an uplink ACK/NACK signal that is a demodulation result of the PDSCH.

Meanwhile, in another component carrier (CC1), while radio resources that the CCE index of 6 (CCE index=6) is the lowest number are allocated to a control signal (DCI) for PDSCH demodulation, user-specific ACK/NACK resources shown by cross diagonal lines in FIG. 3B are allocated to an uplink ACK/NACK signal in response to the PDSCH of CC1. The user-specific ACK/NACK resources are not limited particularly, as long as the resources do not interfere with radio resources allocated to the uplink ACK/NACK signal of the anchor carrier (CC0). The user-specific ACK/NACK resources are capable of being notified by RRC signaling. For example, the user-specific ACK/NACK resources are capable of being assigned a band different from the uplink ACK/NACK signal of the anchor carrier (CC0). Further, the user-specific ACK/NACK resources may be assigned code resources different from the uplink ACK/NACK signal of the anchor carrier (CC0) to undergo CDM (Code Division Multiplex).

By this means, the same resource allocation operation as in LTE is compensated in resource allocation of the uplink ACK/NACK signal of the anchor carrier (CC0). In the case of changing the number of component carriers constituting the system band, the base station instructs the user terminal to change component carriers by RRC signaling. For a period during which the base station transmits RRC signaling (RRC reconfiguration) to the user terminal and receives a Complete message, the base station does not know timing at which the user terminal UE#1 changes, but communications are maintained only for uplink ACK/NACK signals of the anchor carrier (CC0).

An Embodiment of the invention will specifically be described below with reference to accompanying drawings. Described herein is the case of using a base station and mobile station that support the LTE-A system.

Figure 4:
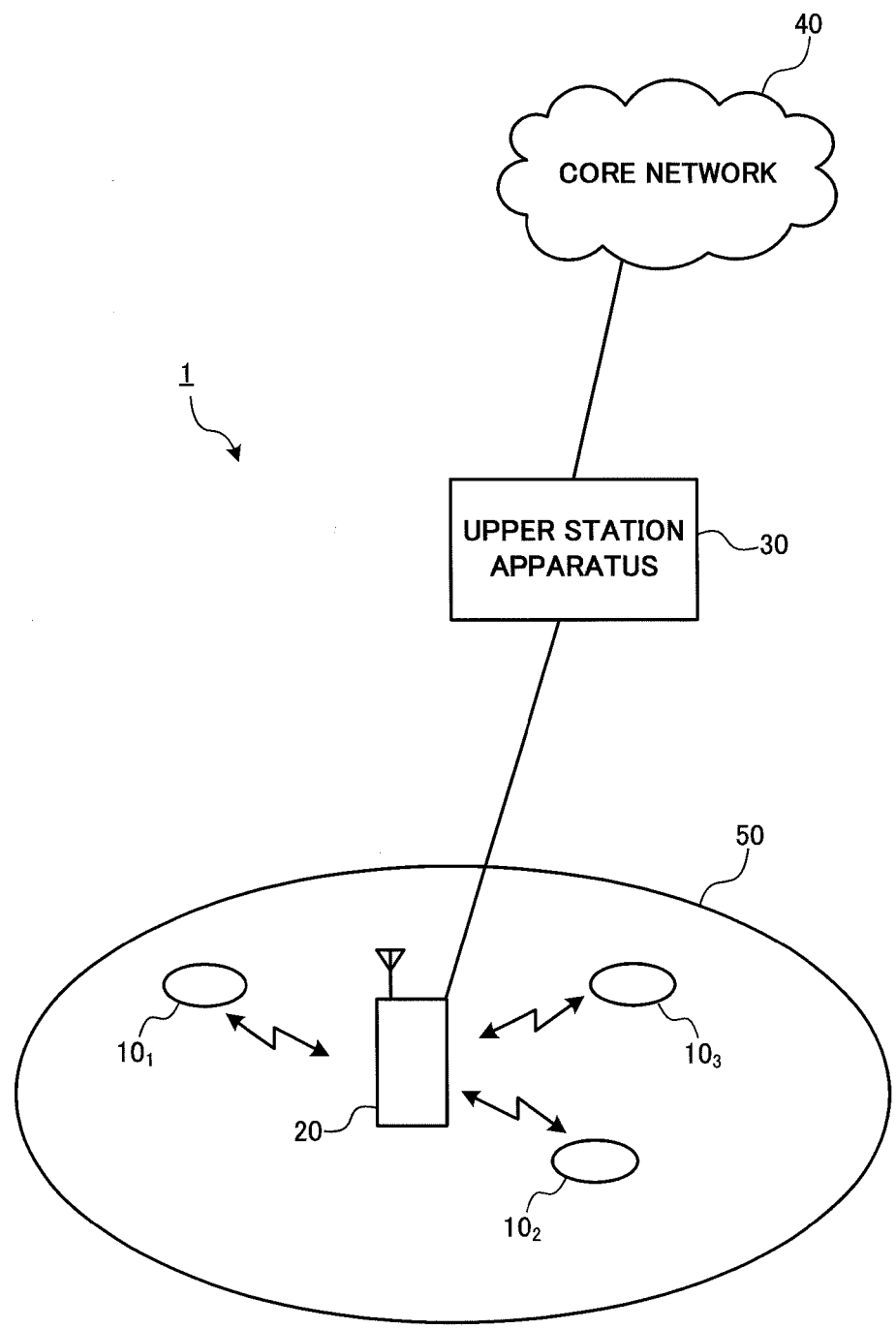
FIG. 4 is an entire diagram of a mobile communication system according to an Embodiment.

Referring to FIG. 4, described is a mobile communication system 1 having mobile stations (UEs) 10 and base station (Node B) 20 according to the Embodiment of the invention. FIG. 4 is a diagram to explain a configuration of the mobile communication system 1 having the mobile stations 10 and base station 20 according to this Embodiment. In addition, the mobile communication system 1 as shown in FIG. 4 is a system including the LTE system or SUPER 3G. Further, the mobile communication system 1 may be called IMT-Advanced or may be called 4G.

As shown in FIG. 4, the mobile communication system 1 includes the base station apparatus 20 and a plurality of mobile terminal apparatuses 10 ($10_1$, $10_2$, $10_3$, ..., $10n$, n is an integer where n>0) that communicate with the base station apparatus 20 and is comprised thereof. The base station apparatus 20 is connected to an upper station apparatus 30, and the upper station apparatus 30 is connected to a core network 40. The mobile terminal apparatus 10 is capable of communicating with the base station apparatus 20 in a cell 50. In addition, for example, the upper station apparatus 30 includes an access gateway apparatus, radio network controller (RNC), mobility management entity (MME), etc., but is not limited thereto.

Each of the mobile terminal apparatuses 10 ($10_1$, $10_2$, $10_3$, ..., $10n$) includes an LTE terminal and LTE-A terminal, and is described as a mobile terminal apparatus 10 unless otherwise specified in the following description. Further, for convenience in description, the description is given while assuming that equipment that performs radio communications with the base station apparatus 20 is the mobile terminal apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system.

Communication channels in downlink have the PDSCH shared among the mobile terminal apparatuses 10, and downlink L1/L2 control channels (PDCCH, PCFICH, and PHICH). User data and higher control signals are transmitted on the PDSCH. The higher control signals include RRC signaling to notify the mobile terminal apparatus 10 of increment/decrement of the carrier aggregation number.

Communication channels in uplink have the PUSCH shared among the mobile terminal apparatuses 10 and the PUCCH that is an uplink control channel. User data is transmitted on the PUSCH. Further, intra-subframe frequency hopping is applied to the PUCCH, and downlink radio quality information (CQI: Channel Quality Indicator) and uplink ACK/NACK signals are transmitted on the PUCCH.

Figure 5:
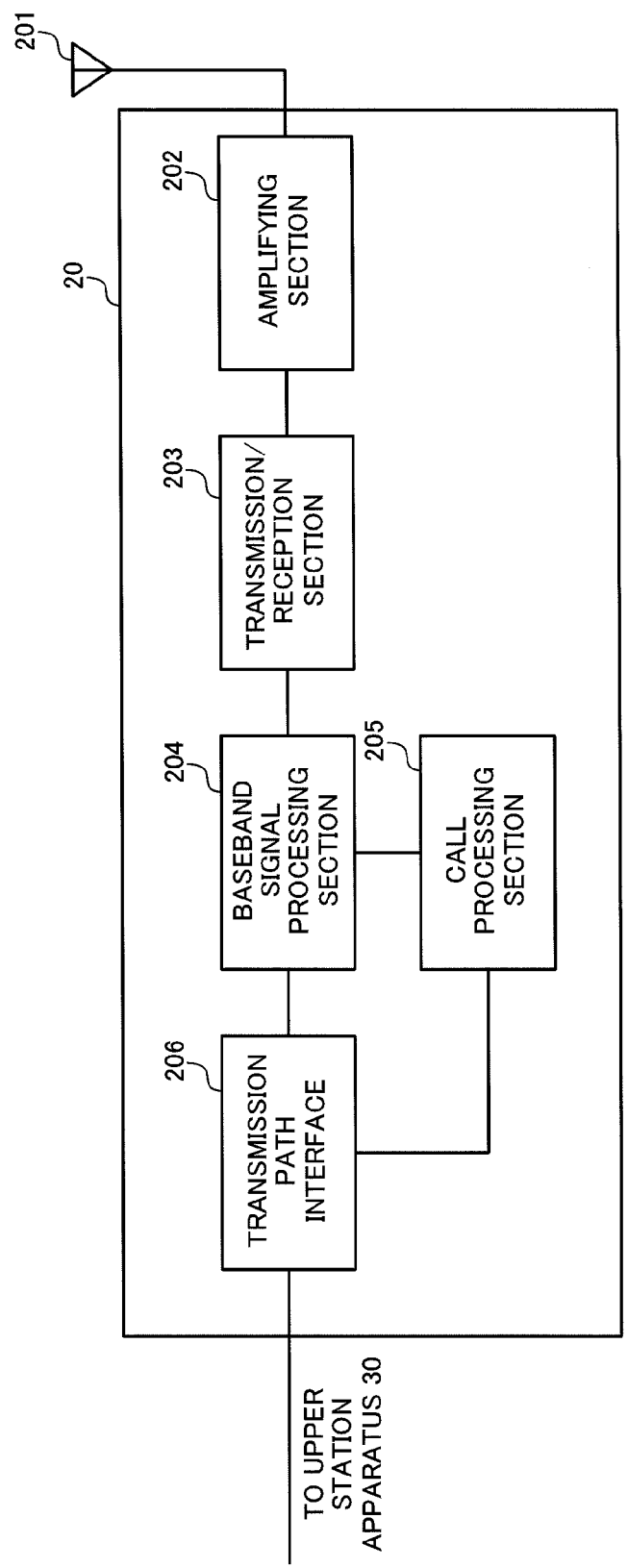
FIG. 5 is a schematic configuration diagram of a base station apparatus according to the Embodiment.

Referring to FIG. 5, described is the entire configuration of the base station apparatus 20 according to this Embodiment. The base station apparatus 20 is provided with a transmission/reception antenna 201, amplifying section 202, transmission/reception section 203, baseband signal processing section 204, call processing section 205 and transmission path interface 206.

The user data transmitted from the base station apparatus 20 to the mobile terminal apparatus 10 in downlink is input to the baseband signal processing section 204 via the transmission path interface 206 from the upper station apparatus 30.

The baseband signal processing section 204 performs PDCP layer processing, segmentation and concatenation of the user data, RLC (Radio Link Control) layer transmission processing such as transmission processing of RLC retransmission control, MAC (Medium Access Control) retransmission control e.g. transmission processing of HARQ (Hybrid Automatic Repeat reQuest), scheduling, transmission format selection, channel coding, Inverse Fast Fourier Transform (IFFT) processing and precoding processing. Further, with respect to a signal of the physical downlink control channel that is a downlink control channel, the transmission processing such as channel coding and Inverse Fast Fourier Transform is also performed.

Further, on a broadcast channel, the baseband signal processing section 204 notifies the mobile terminal apparatuses 10 connected in the same cell 50 of control information for each mobile terminal apparatus 10 to perform radio communications with the base station apparatus 20. For example, the broadcast information for communication in the cell 50 includes a system bandwidth in uplink or downlink, root sequence identification information (Root Sequence Index) to generate a signal of random access preamble on a PRACH, etc.

The transmission/reception section 203 converts the frequency of the baseband signal output from the baseband signal processing section 204 into a radio frequency band. The amplifying section 202 amplifies the transmission signal with the frequency converted to output to the transmission/reception antenna 201.

Meanwhile, with respect to a signal transmitted from the mobile terminal apparatus 10 to the base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of PLC layer and PDCP layer on the user data included in the baseband signal received in uplink. The decoded signal is transferred to the upper station apparatus 30 via the transmission path interface 206.

The call processing section 205 performs call processing such as setting and release of the communication channel, status management of the base station apparatus 20, and management of radio resources.

Figure 6:
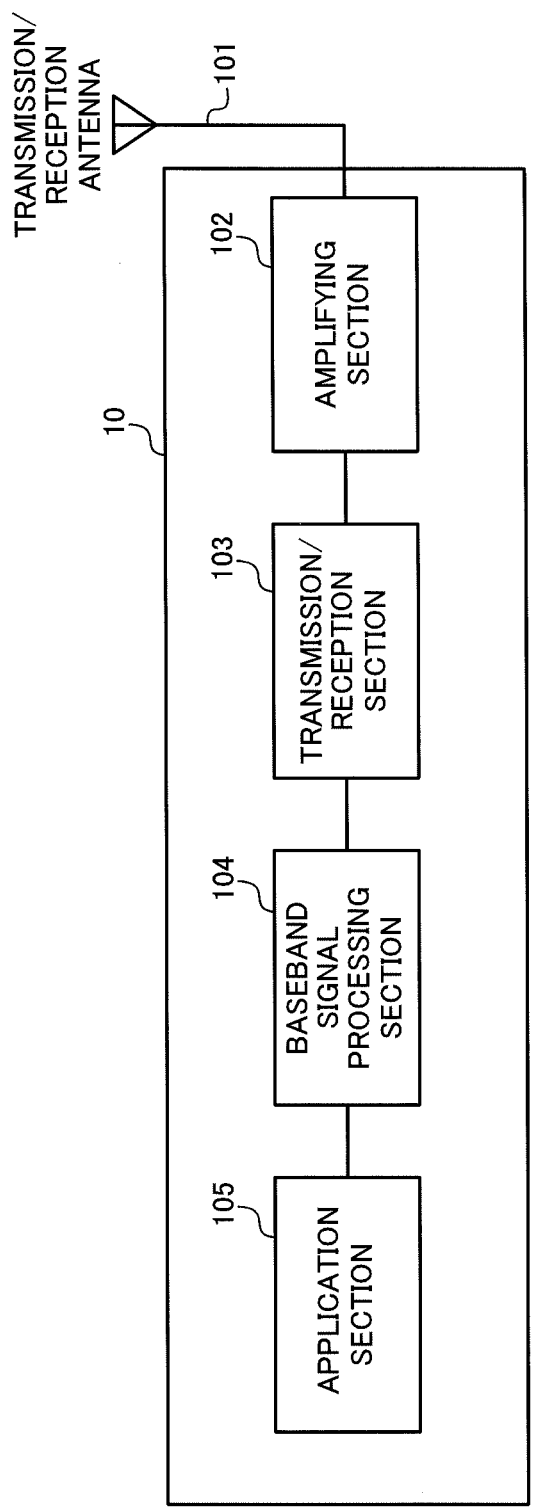
FIG. 6 is a schematic configuration diagram of a mobile terminal apparatus according to the Embodiment.

Referring to FIG. 6, described next is the entire configuration of the mobile terminal apparatus 10 according to this Embodiment. Both the LTE terminal and the LTE-A terminal have the same principal configuration of hardware, and are not distinguished to explain. The mobile terminal apparatus 10 is provided with a transmission/reception antenna 101, amplifying section 102, transmission/reception section 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, user data in downlink is transferred to the application section 105. The application section 105 performs processing concerning layers higher than the physical layer and MAC layer and the like. Further, among the data in downlink, broadcast information is also transferred to the application section 105.

Meanwhile, the application section 105 inputs user data in uplink to the baseband signal processing section 104. The baseband signal processing section 104 performs transmission processing of retransmission control (H-ARQ (Hybrid ARQ)), channel coding, DFT processing, IFFT processing, etc. The transmission/reception section 103 converts the baseband signal output from the baseband signal processing section 104 into a signal with a radio frequency band. Then, the signal is amplified in the amplifying section 102, and is transmitted from the transmission/reception antenna 101.

Figure 7:
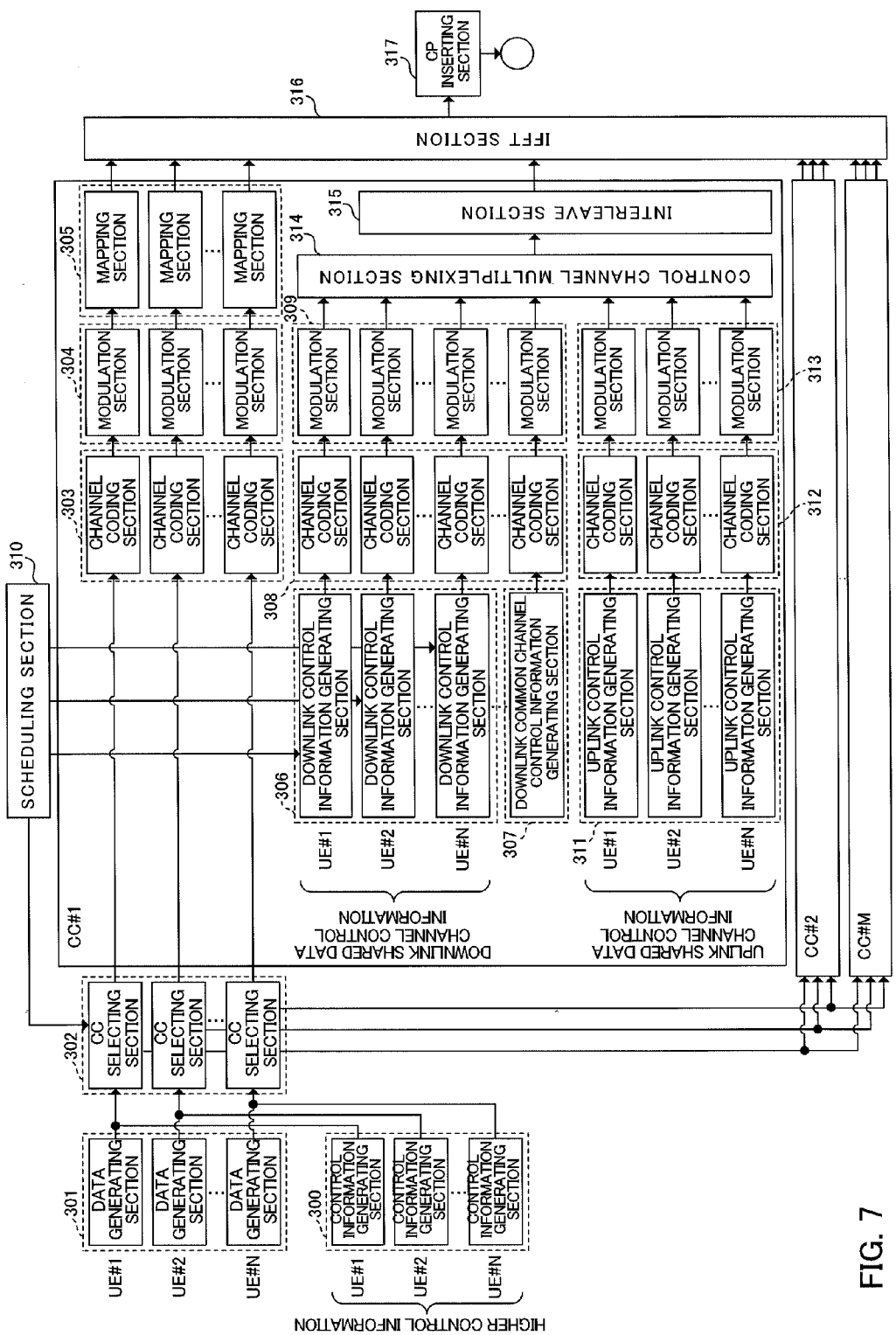
FIG. 7 is a functional block diagram of a transmission processing section in a baseband signal processing section of the base station apparatus according to the Embodiment.

FIG. 7 is a functional block diagram of the baseband signal processing section 204 that the base station apparatus 20 has and a part of the higher layer according to this Embodiment, and in the baseband signal processing section 204, mainly shows functional blocks in a transmission processing section. FIG. 7 illustrates a base station configuration capable of supporting maximum M component carriers (CC#1 to CC#M). Transmission data to mobile terminal apparatuses 10 under the control of the base station apparatus 20 is transferred from the upper station apparatus 30 to the base station apparatus 20.

Each control information generating section 300 generates a higher control signal to perform higher layer signaling (for example, RRC signaling) on a user-by-user basis. The higher control signal is capable of including indication of the carrier number of the anchor carrier, and a command for requesting addition/removal of a component carrier. Assignment of component carriers is controlled so that the anchor carrier is always included in assigned component carriers. Further, to compensate for the same operation as in LTE in the anchor carrier, the CIF (Carrier Indicator Field) is always maintained at "OFF" in the anchor carrier.

Each data generating section 301 outputs the transmission data transferred from the upper station apparatus 30 as user data for each user.

Each component carrier selecting section 302 selects component carriers used in radio communications with the mobile terminal apparatus 10 for each user. The base station apparatus 20 notifies the mobile terminal apparatus 10 of addition/removal of a component carrier by RRC signaling, and receives a Complete message from the mobile terminal apparatus 10. By reception of the Complete message, assignment (addition/removal) of component carriers to the user is determined, and the determined assignment of component carriers is set on the component carrier selecting section 302 as assignment information of component carriers. The higher control signal and transmission data is allocated to channel coding sections 303 of corresponding component carriers according to the assignment information of component carriers set on the component carrier selecting section 302 for each user. Component carriers are assigned so that the anchor carrier is included in the component carriers selected by the component carrier selecting section 203.

A scheduling section 310 controls assignment of component carriers to the mobile terminal apparatuses 10 under control corresponding to communication quality of the entire system band. The scheduling section 310 makes a determination of addition/removal of a component carrier assigned to communication with the mobile terminal apparatus 10. The determination result on addition/removal of a component carrier is notified to the control information generating section 300.

The scheduling section 310 controls resource allocation in each of component carriers CC#0 to CC#M-1. The scheduling section 310 distinguishes between the LTE terminal user and the LTE-A terminal user to perform scheduling. Transmission data and retransmission instructions are input from the upper station apparatus 30 to the scheduling section 310, and further channel estimation value and CQI are input from a receiving section in which uplink signals are measured. The scheduling section 310 performs scheduling of uplink and downlink control signals and uplink and downlink shared channel signals, by referring to the retransmission instructions input from the upper station apparatus 30, channel estimation value and CQI. In propagation paths in mobile communication, variations differ for each frequency by frequency selective fading. Therefore, in transmitting the user data to the mobile terminal apparatus 10, the scheduling section 310 assigns a resource block of good communication quality for each subframe to each mobile terminal apparatus 10 (called adaptive frequency scheduling). In adaptive frequency scheduling, the scheduling section 310 selects the mobile terminal apparatus 10 with good propagation path quality for each resource block to assign. Therefore, the scheduling section 310 assigns resource blocks using the CQI for each resource block fed back from each mobile terminal apparatus 10. Further, the scheduling section 310 determines MCS (coding rate, modulation scheme) that meets a predetermined block error rate in the assigned resource block. Parameters that meet the MCS (coding rate, modulation scheme) determined in the scheduling section 310 are set on the channel coding sections 303, 308, 312 and modulation sections 304, 309, 313.

The baseband signal processing section 204 is provided with the channel coding sections 303, modulation sections 304 and mapping sections 305 corresponding to the maximum user multiplexing number N in one component carrier. The channel coding sections 303 perform channel coding on shared data channels (PDSCHs) comprised of user data (including a part of the higher control signal) output from respective data generating sections 301 for respective users. The modulation sections 304 modulate the channel-coded user data for respective users. The mapping sections 305 map the modulated user data to radio resources.

Further, the baseband signal processing section 204 is provided with downlink control information generating sections 306 that generate downlink shared data channel control information that is user-specific downlink control information, and downlink common channel control information generating sections 307 that generate downlink common control channel control information that is downlink control information common to users.

The downlink control information generating sections 306 generate downlink control signals (DCI) from the resource allocation information determined for each user, MCS information, HARQ information, transmission power control command of the PUCCH and the like. At this point, the downlink control information generating section 306 generates downlink shared data channel control information that compensates for the same operation as in LTE in the anchor carrier among component carriers assigned to the user. More specifically, the DCI has a DCI configuration without the CIF being added, and is arranged in a search space determined according to the rule defied in LTE. Information for identifying the anchor carrier among the component carriers assigned to the user is notified from the scheduling section 310.

The baseband signal processing section 204 is provided with channel coding sections 308, and modulation sections 309 corresponding to the maximum user multiplexing number N in one component carrier. The channel coding sections 308 perform channel coding on the control information generated in the downlink control information generating sections 306 and downlink common channel control information generating sections 307 for respective users. The modulation sections 309 modulate the channel-coded downlink control information.

Further, the baseband signal processing section 204 is provided with uplink control information generating sections 311 that generate uplink shared data channel control information that is control information to control the uplink shared data channels (PUSCHs) for respective users, channel coding sections 312 that perform channel coding on the generated uplink shared data channel control information for respective users, and modulation sections 313 that modulate the channel-coded uplink shared data channel control information for respective users.

The control information modulated for respective users in the modulation sections 309, 313 is multiplexed in a control channel multiplexing section 314, and is further interleaved in an interleave section 315. The control signal output from the interleave section 315 and user data output from the mapping section 305 is input to an IFFT section 316 as a downlink channel signal. The IFFT section 316 performs inverse fast Fourier transform on the downlink channel signal, and transforms the signal in the frequency domain into the time-series signal. A cyclic prefix inserting section 317 inserts a cyclic prefix in the time-series downlink channel signal. In addition, the cyclic prefix functions as a guard interval to absorb differences in multipath propagation delay. The transmission data with the cyclic prefix added is output to the transmission/reception section 203.

Figure 8:
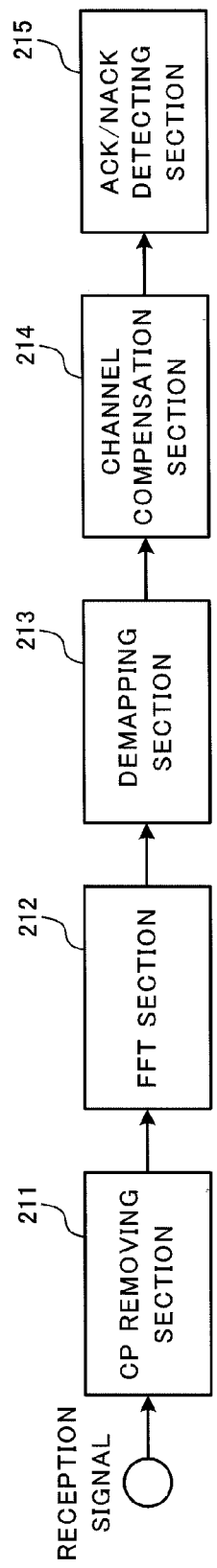
FIG. 8 is a functional block diagram of a reception processing section in the baseband signal processing section of the base station apparatus according to the Embodiment.

FIG. 8 shows functional blocks of a reception processing section in the baseband signal processing section 204 in the base station apparatus 20, and mainly shows processing sections to detect an uplink ACK/NACK signal. The section is provided with a CP removing section 211 that removes a CP from a reception signal, an FFT section 212 that performs fast Fourier transform on the CP-removed reception signal to transform into a signal in the frequency domain, a demapping section 213 that demaps the reception signal in the frequency domain, a channel compensation section 214 that performs channel compensation from an estimation value of each physical channel, and an ACK/NACK detecting section 215 that detects an uplink ACK/NACK signal from the channel-compensated PUCCH. The demapping section 213 applies demapping processing to both the anchor carrier and the other component carriers.

Figure 9:
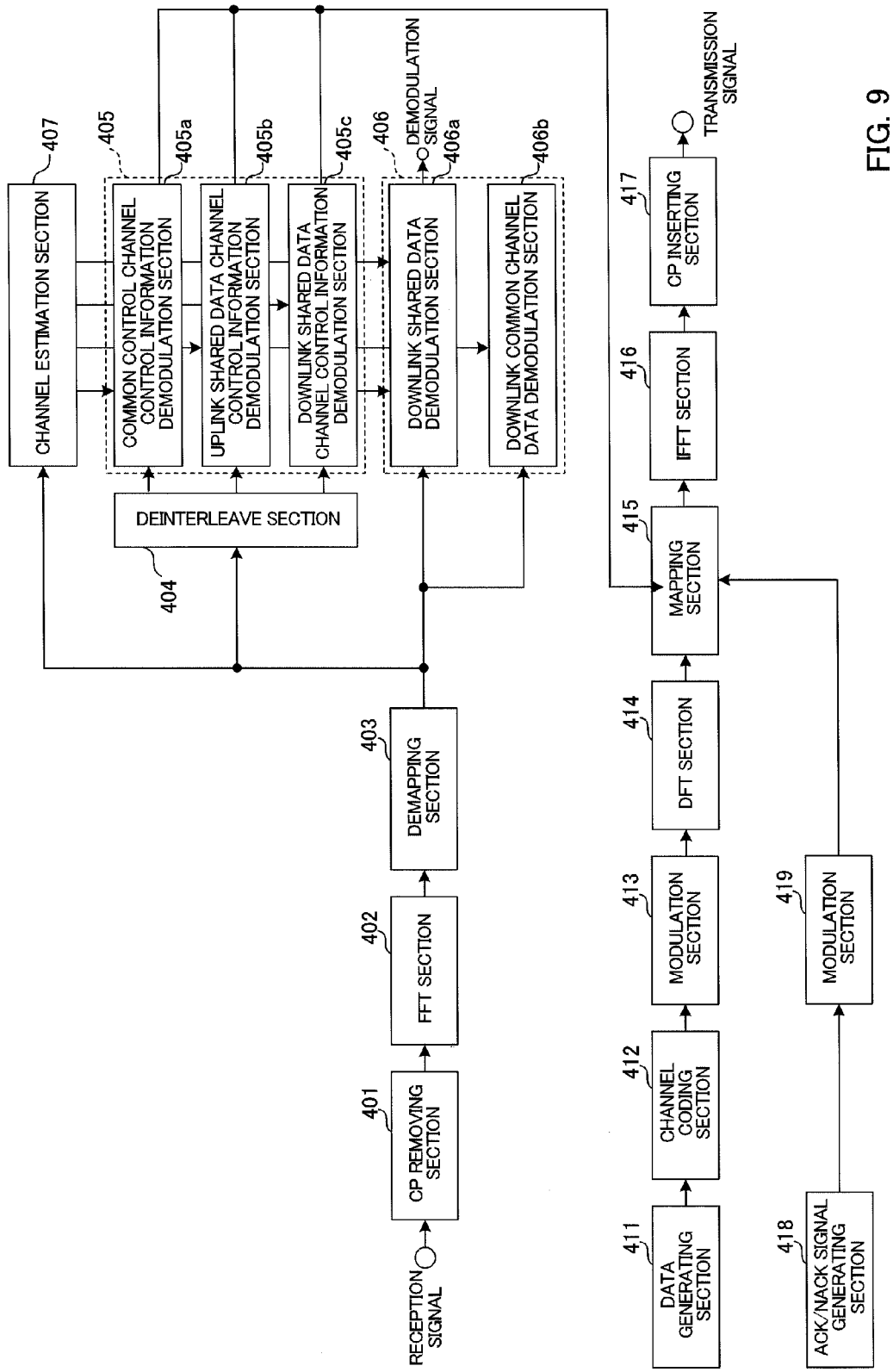
FIG. 9 is a functional block diagram of a baseband signal processing section that the mobile terminal apparatus has according to the Embodiment.

FIG. 9 is a functional block diagram of the baseband signal processing section 104 that the mobile terminal apparatus 10 has, and shows functional blocks of the LTE-A terminal that supports LTE-A. Described first is a downlink configuration of the mobile terminal apparatus 10.

A CP removing section 401 removes the CP from a downlink signal received from the radio base station apparatus 20 as reception data. The CP-removed downlink signal is input to an FFT section 402. The FFT section 402 performs Fast Fourier Transform (FFT) on the downlink, and transforms the signal in the time domain into the signal in the frequency domain to output to a demapping section 403. The demapping section 403 demaps the downlink signal, and extracts multiplexed control information into which is multiplexed a plurality of pieces of control information, user data and higher control signal from the downlink signal. In addition, the demapping processing in the demapping section 403 is performed based on the higher control signal input from the application section 105. The multiplexed control information output from the demapping section 403 is deinterleaved in a deinterleave section 404.

Further, the baseband signal processing section 104 is provided with a control information demodulation section 405 that demodulates the control information, data demodulation section 406 that demodulates the downlink shared data and channel estimation section 407. The control information demodulation section 405 is provided with a common control channel control information demodulation section 405a that demodulates the downlink common control channel control information from the multiplexed control information, an uplink shared data channel control information demodulation section 405b that demodulates the uplink shared data channel control information from the multiplexed control information, and a downlink shared data channel control information demodulation section 405c that demodulates the downlink shared data channel control information from the multiplexed control information. The data demodulation section 406 is provided with a downlink shared data demodulation section 406a that demodulates the user data and higher control signal, and a downlink common channel data demodulation section 406b that demodulates the downlink common channel data.

The common control channel control information demodulation section 405a extracts the common control channel control information that is the control information common to users by blind decoding processing in a common search space of the multiplexed control information (PDCCH), demodulation processing, channel decoding processing and the like. The common control channel control information includes the downlink channel quality information (CQI), is input to a mapping section 415, described later, and is mapped as a part of transmission data to the radio base station apparatus 20.

The uplink shared data channel control information demodulation section 405b extracts the uplink shared data channel control information that is the user-specific uplink control information by blind decoding processing in a user-specific search space of the multiplexed control information (PDCCH), demodulation processing, channel decoding processing and the like. The uplink shared data channel control information is used in control of the uplink shared data channel (PUSCH), and is output to the downlink common channel data demodulation section 406b.

The downlink shared data channel control information demodulation section 405c extracts the downlink shared data channel control information that is the user-specific downlink control signal by blind decoding processing in the user-specific search space of the multiplexed control information (PDCCH), demodulation processing, channel decoding processing and the like. The downlink shared data channel control information is used in control of the downlink shared data channel (PDSCH), and is output to the downlink shared data demodulation section 406.

Further, the downlink shared data channel control information demodulation section 405c performs the blind decoding processing in the user-specific search space, based on the information about the PDCCH and PDSCH included in the hither control signal demodulated in the downlink shared data demodulation section 406a.

The downlink shared data demodulation section 406a acquires the user data and higher control signal, based on the downlink shared data channel control information input from the downlink shared data channel control information demodulation section 405c. The higher control information (including mode information) is output to the channel estimation section 407. The downlink common channel data demodulation section 406b demodulates the downlink common channel data, based on the uplink shared data channel control information input from the uplink shared data channel control information demodulation section 405b.

The channel estimation section 407 performs channel estimation using a common reference signal. The channel estimation section 407 outputs the estimated channel variation to the common control channel control information demodulation section 405a, uplink shared data channel control information demodulation section 405b, downlink shared data channel control information demodulation section 405c, and downlink shared data demodulation section 406a. These demodulation sections demodulate downlink signals using the estimated channel variation and demodulation reference signal.

The baseband signal processing section 104 is provided with a data generating section 411, channel coding section 412, modulation section 413, DFT section 414, mapping section 415, IFFT section 416, and CP inserting section 417. The data generating section 411 generates transmission data from bit data input from the application section 105. The channel coding section 412 performs channel coding processing such as error correction on the transmission data, and the modulation section 413 modulates the channel-coded transmission data by QPSK or the like. The DFT section 414 performs discrete Fourier transform on the modulated transmission data. The mapping section 415 maps each frequency component of the DFT-processed data symbol to a subcarrier position indicated by the base station apparatus. In other words, the mapping section 415 inputs each frequency component of the data symbol to a subcarrier position of the IFFT section 416 having the bandwidth that corresponds to the system band, and sets "0" on the other frequency component. The IFFT section 416 performs inverse fast Fourier transform on the input data that corresponds to the system band to transform into the time-domain data, and the CP inserting section 417 inserts the CP in the time-domain data in a data break.

Described next is the operation of this Embodiment configured as described above.

In performing carrier aggregation on a plurality of component carriers, it is agreed in RAN1 #59 (3GPP TSG RAN WG1 Meeting) linking a downlink carrier and an uplink carrier. First, for communication with the mobile terminal apparatus 10, a cell-specific uplink and downlink pair is assigned to the same component carrier (UL/DL #CC0), and on the component carrier CC0, a user-specific uplink and downlink pair is established. Then, when other component carriers #CC1 to #CC3 are assigned to the user-specific downlink, the component carriers #CC1 to #CC3 are added to the user-specific downlink. Then, when limitations are not imposed on addition/removal of a component carrier, the cell-specific and user-specific link to the former component carrier #CC0 is removed.

As described above, in the system configuration capable of assigning component carriers in downlink and uplink individually, the base station apparatus 20 selects one from a plurality of component carriers (for example, four CCs of CC#0 to CC#3) assigned to the mobile terminal apparatus 10 as the anchor carrier. In the present invention, the method of selecting the anchor carrier is not limited. For example, the lowest component carrier number may be selected as the anchor carrier, or the component carrier number to be the anchor carrier may be shifted periodically. Further, the anchor carrier may be selected from component carriers of which communication quality exceeds a predetermined value.

Figure 10:
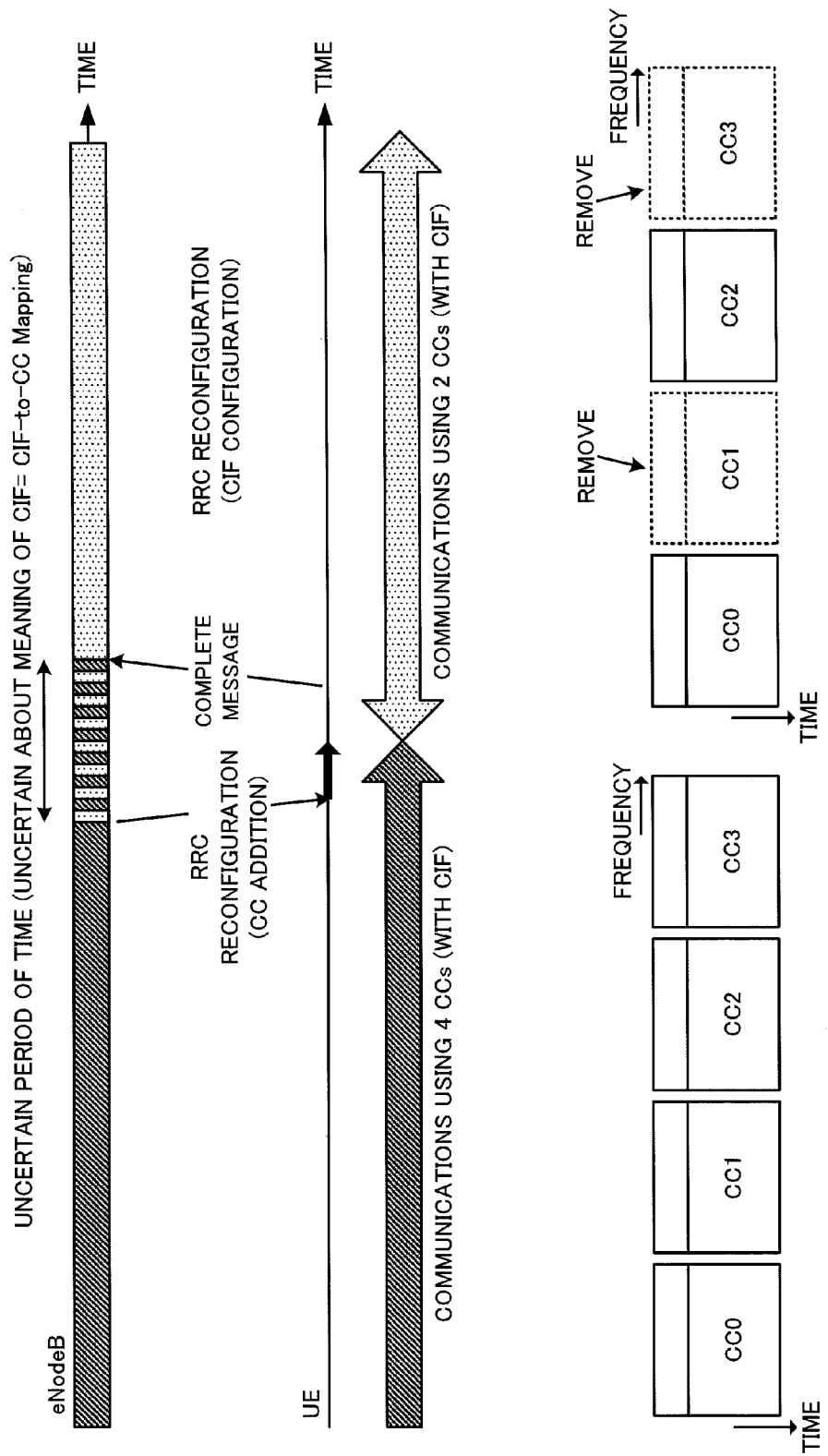
FIG. 10 is a sequence diagram in the case where component carriers are removed.

FIG. 10 illustrates a case where a change occurs in assignment of component carriers to the mobile terminal apparatus 10. The carrier aggregation number of component carriers to the mobile terminal apparatus 10 changes from "4" to "2".

The mobile terminal apparatus 10 (UE#1) is assigned four component carriers, CC#0 to CC#3. When two component carriers are removed from the component carriers assigned to communications with the mobile terminal apparatus 10 (UE#1), the base station apparatus 20 transmits RRC signaling (RRC reconfiguration: CC addition) for designating the component carrier numbers to remove to the mobile terminal apparatus 10 (UE#1). Upon receiving the command (CC addition) subjected to RRC signaling, the mobile terminal apparatus 10 (UE#1) prepares for communications in which two component carriers, CC#1 and CC#3, has been removed. When the preparation for removal of two component carriers, CC#1 and CC#3, is completed, the mobile terminal apparatus 10 returns a Complete message to the base station apparatus 20. The base station apparatus 20 does not know whether the mobile terminal apparatus 10 (UE#1) is capable of supporting communications via two component carriers, CC#0 and CC#2, for a period during which the base station apparatus 20 transmits RRC signaling (RRC reconfiguration) to the mobile terminal apparatus 10 (UE#1) and receives the Complete message.

In the invention, one of component carriers assigned to the user is selected as an anchor carrier, it is defined to compensate for the operation of LTE in the anchor carrier, and it is recognized between the base station apparatus 20 and the mobile terminal apparatus 10 (UE#1) that one of the component carriers assigned to the mobile terminal apparatus 10 (UE#1) is the anchor carrier. In the case of adding/removing the number of component carriers used in communications between the base station apparatus 20 and the mobile terminal apparatus 10 (UE#1), an uplink ACK/NACK signal is transmitted via the anchor carrier at least for an uncertain period of time. In other words, for a uncertain period of time during which the number of component carriers is uncertain, transmission of uplink ACK/NACK signals by LTE is maintained via the anchor carrier in which the operation of LTE is compensated.

The base station apparatus 20 notifies the mobile terminal apparatus 10 of the number of the component carrier to be the anchor carrier by RRC signaling. The index number of the component carrier to be the anchor carrier may be notified using the broadcast channel. Alternatively, a first carrier in starting communications may be determined automatically to be the anchor carrier.

In the base station apparatus 20, the downlink control information generating section 306 for the mobile terminal apparatus 10 generates again the downlink control information for each of the component carriers CC#0 to CC#3 assigned to the mobile terminal apparatus 10. At this point, to compensate for the same operation as in LTE, the downlink control information (DCI) to be multiplexed into the downlink control channel of the anchor carrier is controlled to be the configuration meeting the specifications of LTE. More specifically, the DCI configuration adopts the format in conformity with LTE, and the search space in which the DCI without the CIF being added is arranged is determined in the same manner as in LTE.

Described is the processing process up to mapping of the DCI to a predetermined region of the PDCCH.

The downlink control information generating section 306 generates the downlink control information (DCI). The DCI configuration defined in LTE is provided with resource allocation information (Resource block assignment) for each terminal, MCS information (Modulation and Coding Scheme) of the assigned resource block or transport block information, information required to use Hybrid AK used to correct a reception data error occurring on the terminal side with high efficiency and low delay, specifically, the memory number corresponding to combining of initially transmitted packet and retransmitted packet, i.e. HARQ process number, an identifier (New data identifier) to distinguish between the new data and the retransmitted data, information (Redundancy version) indicative of a transmitted portion of the coded sequence, and transmission power control command for the PUCCH (TPC for PUCCH), and is comprised thereof.

The channel coding section 308 adds the CRC masked with the user ID (UE-ID) to the downlink control information (DCI) of the user terminal multiplexed into the same subframe, and then, performs channel coding. Further, corresponding to the reception quality of each user terminal, rate matching is performed to 72, 144, 288 or 576 bits (the case of 72 bits or 576 bits corresponds to the coding rate of ⅔, 1/12). Herein, 72 bits are defined as a base unit (CCE: Control Channel Element), and the optimal number of CCEs is determined from among defined four kinds of numbers of CCEs={1, 2, 4, 8} corresponding to the reception quality. The number of CCEs is notified from the scheduling section 310. Further, the modulation section 309 performs QPSK modulation, and then, the control channel multiplexing section 314 multiplexes control information of a plurality of user terminals (CCE multiplexing). To obtain the frequency diversity effect, the interleave section 315 interleaves on an REG-by-REG basis (the REG is an abbreviation of Resource Element Group, and is comprised of 4 REs) (CCE interleaving). Subsequently, the resultant is mapped to the beginning of a subframe.

In the mobile terminal apparatus 10, the deinterleave section 404 deinterleaves the PDCCH mapped to one to three OFDM symbols at the beginning of the subframe. The mobile terminal apparatus 10 is uncertain about the rate matching parameter (the number of CCEs) and the starting position of the CCEs, and therefore, performs blind decoding on a CCE-by-CCE basis to search for a CCE such that the CRC masked with the user ID is OK.

The common control channel control information demodulation section 405a performs blind decoding on a common search space of the PDCCH of the reception component carrier, and extracts the common control channel control information that is the control information common to users. The common control channel control information includes the channel quality information (CQI) in downlink, is input to a mapping section 115, described later, and is mapped as part of the transmission data to the base station apparatus 20. Further, the downlink control information for the user-specific shared data channel is extracted. The downlink control information is input to the downlink shared data demodulation section 406a.

The downlink shared data channel control information demodulation section 405c performs blind decoding on a user-specific search space of the PDCCH of the reception component carrier, and demodulates the user-specific downlink control information. The downlink control information is input to the downlink shared data demodulation section 406a. At this point, the section 405c notifies the mapping section 415 of the lowest CCE index among CCEs to which is assigned the DCI to the apparatus 10 in the anchor carrier (CC0).

The downlink shared data demodulation section 406a demodulates the PDSCH of the reception component carrier, based on the downlink shared data channel control information input from the common control channel control information demodulation section 405a and the downlink shared data channel control information demodulation section 405c. At this point, the downlink shared data demodulation section 406a notifies an ACK/NACK signal generating section 418 of the demodulation result of the PDSCH.

The ACK/NACK signal generating section 418 of the mobile terminal apparatus 10 is given demodulation results of the PDSCHs of the anchor carrier and the other component carriers from the downlink shared data demodulation section 406a. The ACK/NACK signal generating section 418 generates ACK/NACK signals in response to the demodulation results of the PDSCHs. The ACK/NACK signal generated for each component carrier is modulated in the modulation section 419, and is input to the mapping section 415.

Figure 11:
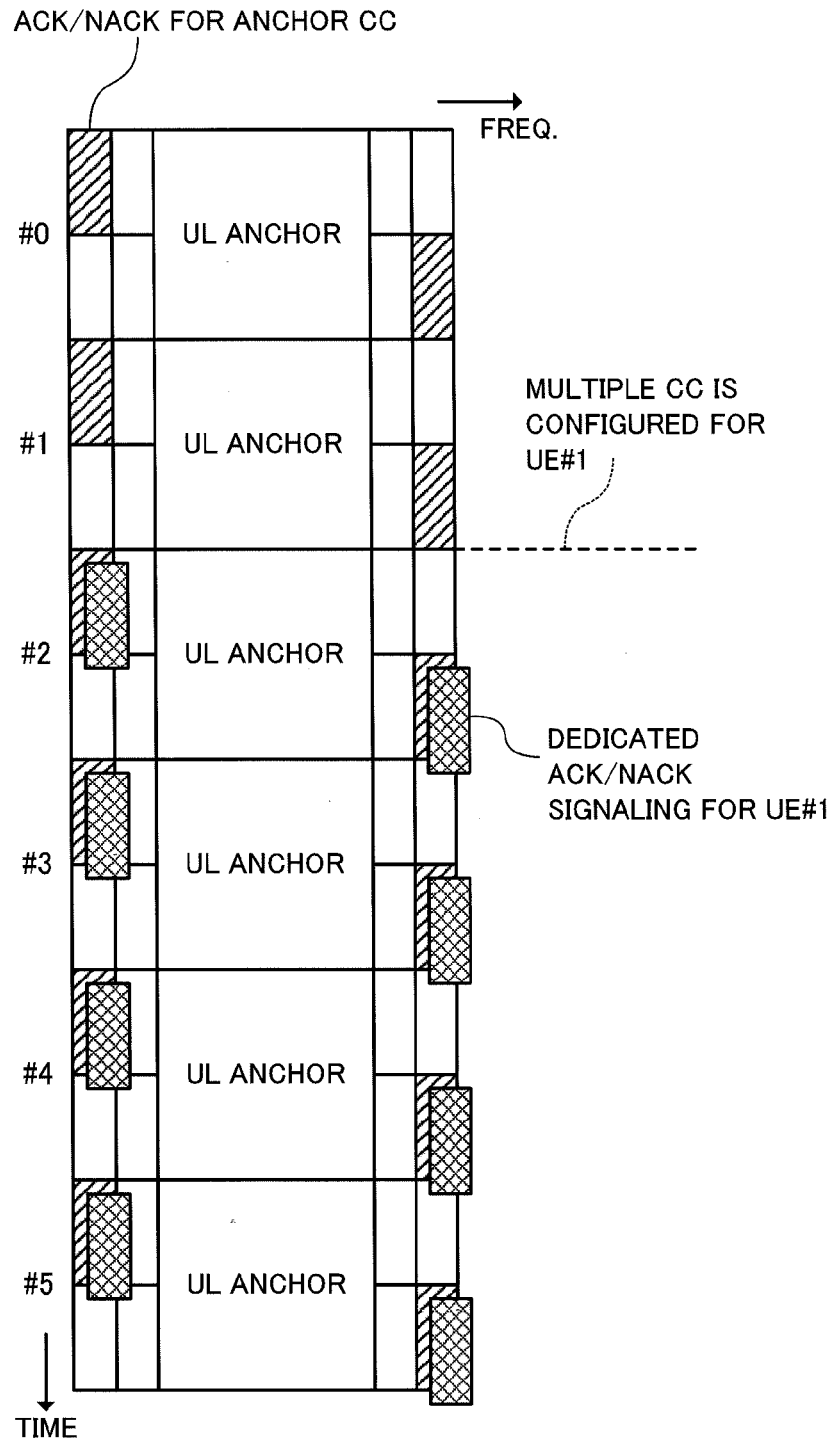
FIG. 11 is a diagram to explain mapping of uplink ACK/NACK signals.

Referring to FIG. 11, described is mapping of uplink ACK/NACK signals by the mapping section 415. In FIG. 11, one component carrier (only the anchor carrier) is assigned before subframes #0 and #1, and a plurality of component carriers is assigned since the subframe #2.

When only one component carrier is assigned (subframes #0 and #1), the mapping section 415 allocates radio resources of the uplink ACK/NACK signal in the same manner as in LTE. In other words, as shown in FIG. 1, the mapping section 415 assigns an ACK index of the same number as the lowest CCE index among CCEs assigned to the downlink control information (DCI) to radio resources of the uplink ACK/NACK signal.

Meanwhile, when a plurality of component carriers is assigned, radio resources of the uplink ACK/NACK signal are allocated in the same manner as in LTE in the anchor carrier, and user-specific ACK/NACK resources are allocated to uplink ACK/NACK signals in response to the PDSCHs except the anchor carrier. The base station apparatus 20 may perform RRC signaling of the user-specific ACK/NACK resources.

Thus, the uplink ACK/NACK signals are mapped to radio resources, and an uplink control signal including the uplink ACK/NACK signals is subjected to inverse fast Fourier transform in the IFFT section 416, and is transformed into the signal in the time domain. Then, the CP inserting section 417 inserts the CP, and the signal is transmitted.

The base station apparatus 20 receives the PUCCH or PUSCH transmitted from the mobile terminal apparatus 10. The CP removing section 211 removes the CP from the reception signal, the FFT section 212 transforms the signal into the signal in the frequency domain, and then, the signal is input to the demapping section 213. The demapping section 213 separates the PUCCH of the anchor carrier in the same manner as in LTE. In other words, the uplink ACK/NACK signal is separated and demodulated from the same ACK index as the lowest CCE number of CCEs assigned to the PDCCH. Further, with respect to the PUCCHs of component carriers except the anchor carrier, the demapping section 213 separates and demodulates from the user-specific ACK/NACK resources. In this way, the demapping section 213 separates the uplink ACK/NACK signals differently in the anchor carrier and the other component carriers. The differently separated uplink ACK/NACK signal is subjected to channel compensation and is given to the ACK/NACK detecting section 215.

Thus, according to this Embodiment, one component carrier is selected as the anchor carrier from among assigned component carriers, the operation of LTE is compensated in the anchor carrier, the mobile terminal apparatus 10 (UE#1) transmits an uplink ACK/NACK signal in the same operation as in LTE via the anchor carrier even in the case of adding/deleting the number of component carriers, and it is thereby possible to maintain transmission of uplink ACK/NACK signals even for a uncertain period of time during which the number of component carriers is uncertain.

The present application is based on Japanese Patent Application No. 2010-090707 filed on Apr. 9, 2010, entire content of which is expressly incorporated by reference herein.

The invention claimed is:

1. A user terminal configured to connect to a communication system in which a system band is added or removed on a base frequency block basis to communicate, comprising:
a reception section configured to receive a data channel for user data transmission for each of base frequency blocks that constitute the system band;
a demodulation section configured to demodulate the data channel of each of the base frequency blocks received in the reception section;
an ACK/NACK signal generating section configured to generate an uplink ACK/NACK signal for each of the base frequency blocks in response to a demodulation result of the data channel in the demodulation section; and
a mapping section configured to define one of the base frequency blocks that constitute the system band as an anchor block, and allocate a radio resource of an uplink base frequency block to an uplink ACK/NACK signal generated in response to a data channel demodulation result of the anchor block, using a resource allocation scheme for one base frequency block, while allocating a radio resource of the uplink base frequency block to an uplink ACK/NACK signal generated in response to a data channel demodulation result of another base frequency block, using a resource allocation scheme for a plurality of base frequency blocks, wherein
the mapping section allocates the radio resource of the uplink base frequency block, which is associated with a radio resource allocated to the data channel of the anchor block, to the uplink ACK/NACK signal of the anchor block using the resource allocation scheme for one base frequency block,
the mapping section allocates a user-specific radio resource of the uplink base frequency block to the uplink ACK/NACK signal of the other base frequency block using the resource allocation scheme for the plurality of base frequency blocks, and
the mapping section maintains allocation of the anchor block using the resource allocation scheme for one base frequency block in a period from notification of an instruction for changing a base frequency block number in the system band until preparation for changing the base frequency block number is completed.

2. The user terminal according to claim 1, wherein the other base frequency block is added or removed while the anchor block is maintained.

3. The user terminal according to claim 1, wherein the mapping section maintains the allocation of the anchor block using the resource allocation scheme for one base frequency block in the period so that transmission of the uplink ACK/NACK signal associated with the anchor block is maintained in the period.

4. The user terminal according to claim 1, wherein the base frequency block number in the system band is a carrier aggregation number, and the period is a transition period to change the carrier aggregation number.

5. The user terminal according to claim 1, wherein the instruction is notified by RRC signaling, and the user terminal transmits a complete message to a base station when the preparation for changing the base frequency block number is completed.

6. A base station apparatus comprising:
a selecting section configured to add or remove a system band used in a communication with a user terminal on a base frequency block basis;
a transmission section configured to transmit a data channel for user data transmission for each of base frequency blocks that constitute the system band;
a reception section configured to receive an uplink control channel including an uplink ACK/NACK signal indicative of a data channel demodulation result of each of the base frequency blocks, through one uplink base frequency block; and
a demapping section configured to define one of the base frequency blocks that constitute the system band as an anchor block, and demap an uplink ACK/NACK signal of the anchor block using a resource allocation scheme for one base frequency block, while demapping an uplink ACK/NACK signal of another base frequency block using a resource allocation scheme for a plurality of base frequency blocks, wherein
the radio resource of the uplink base frequency block, which is associated with a radio resource allocated to the data channel of the anchor block, is allocated to the uplink ACK/NACK signal of the anchor block by the resource allocation scheme for one base frequency block,
a user-specific radio resource of the uplink base frequency block is allocated to the uplink ACK/NACK signal of the other base frequency block by the resource allocation scheme for the plurality of base frequency blocks, and
the demapping section maintains demapping of the uplink ACK/NACK signal of the anchor block using the resource allocation scheme for one base frequency block in a period after an instruction for changing a base frequency block number in the system band is transmitted until notification that preparation for changing the base frequency block number in the user terminal is completed is received.

7. A method of assigning an uplink control signal in a communication system in which a system band is added or removed on a base frequency block basis, comprising the steps of:
receiving a data channel for user data transmission for each of base frequency blocks that constitute the system band;
demodulating the received data channel of each of the base frequency blocks;
generating an uplink ACK/NACK signal for each of the base frequency blocks in response to a demodulation result of the data channel; and
defining one of the base frequency blocks that constitute the system band as an anchor block, and allocating a radio resource of an uplink base frequency block to an uplink ACK/NACK signal generated in response to a data channel demodulation result of the anchor block, using a resource allocation scheme for one base frequency block, while allocating a radio resource of the uplink base frequency block to an uplink ACK/NACK signal generated in response to a data channel demodulation result of another base frequency block, using a resource allocation scheme for a plurality of base frequency blocks, wherein
the allocating using a resource allocation scheme for one base frequency block allocates the radio resource of the uplink base frequency block, which is associated with a radio resource allocated to the data channel of the anchor block, to the uplink ACK/NACK signal of the anchor block,
the allocating using a resource allocation scheme for a plurality of base frequency blocks allocates a user-specific radio resource of the uplink base frequency block to the uplink ACK/NACK signal of the other base frequency block using the resource allocation scheme for the plurality of base frequency blocks, and
the allocating maintains allocation of the anchor block using the resource allocation scheme for one base frequency block in a period from notification of an instruction for changing a base frequency block number in the system band until preparation for changing the base frequency block number is completed.

* * * * *